US010095850B2

(12) United States Patent
Cook et al.

(10) Patent No.: US 10,095,850 B2
(45) Date of Patent: Oct. 9, 2018

(54) USER IDENTITY AUTHENTICATION TECHNIQUES FOR ON-LINE CONTENT OR ACCESS

(71) Applicant: Kadenze, Inc., Valencia, CA (US)

(72) Inventors: Perry R. Cook, Jacksonville, OR (US); Ajay Kapur, Valencia, CA (US); Owen S. Vallis, Valencia, CA (US); Jordan Hochenbaum, Valencia, CA (US)

(73) Assignee: Kadenze, Inc., Valencia, CA (US)

( * ) Notice: Subject to any disclaimer, the term of this patent is extended or adjusted under 35 U.S.C. 154(b) by 37 days.

(21) Appl. No.: 14/716,591

(22) Filed: May 19, 2015

(65) Prior Publication Data

US 2015/0379253 A1 Dec. 31, 2015

Related U.S. Application Data

(63) Continuation-in-part of application No. 14/659,118, filed on Mar. 16, 2015.
(Continued)

(51) Int. Cl.
| | |
|---|---|
| *G06F 7/04* | (2006.01) |
| *G06F 21/32* | (2013.01) |
| *G09B 5/00* | (2006.01) |
| *G09B 5/06* | (2006.01) |
| *G09B 7/02* | (2006.01) |
| *G06Q 50/20* | (2012.01) |
| *G06Q 40/00* | (2012.01) |
| *H04L 29/06* | (2006.01) |
| *G06F 21/31* | (2013.01) |
| *G06F 17/30* | (2006.01) |

(52) U.S. Cl.
CPC .......... *G06F 21/32* (2013.01); *G06F 21/316* (2013.01); *G06Q 40/12* (2013.12); *G06Q 50/205* (2013.01); *G09B 5/00* (2013.01); *G09B 5/06* (2013.01); *G09B 7/02* (2013.01); *H04L 63/0861* (2013.01)

(58) Field of Classification Search
CPC ........ G06F 21/32; G06F 21/316; G06F 21/36; G06F 21/00; H04L 63/0861; H04L 63/083
USPC ............... 381/56; 726/16, 19; 434/157, 362; 713/186
See application file for complete search history.

(56) References Cited

U.S. PATENT DOCUMENTS

| | | |
|---|---|---|
| 5,199,068 A | 3/1993 | Cox |
| 5,909,589 A | 6/1999 | Parker |

(Continued)

FOREIGN PATENT DOCUMENTS

WO    WO 00/07087    2/2000

OTHER PUBLICATIONS

Pin Shen Teh et al: "Improving keystroke dynamics authentication system via multiple feature fusion scheme", Cyber Security, Cyber Warfare and Digital Forensic (CYBERSEC), 2012 International Conference on, IEEE, Jun. 26, 2012, pp. 277-282.

(Continued)

*Primary Examiner* — Gary S Gracia
(74) *Attorney, Agent, or Firm* — Haynes and Boone, LLP

(57) ABSTRACT

On-line course offerings can be made available to users using computational techniques that reliably authenticate the identity of individual student users during the course of the very submissions and/or participation that will establish student user proficiency with course content. Authentication methods and systems include applications of behavioral biometrics.

25 Claims, 8 Drawing Sheets

Related U.S. Application Data

(60) Provisional application No. 62/000,522, filed on May 19, 2014.

(56) References Cited

U.S. PATENT DOCUMENTS

| | | | |
|---|---|---|---|
| 8,285,658 B1 | 10/2012 | Kellas-Dicks et al. | |
| 8,533,486 B1 | 9/2013 | Stark et al. | |
| 8,594,374 B1* | 11/2013 | Bozarth | G06F 21/36 382/103 |
| 8,838,970 B1 | 9/2014 | Suresh | |
| 2002/0135618 A1* | 9/2002 | Maes | G06F 3/0481 715/767 |
| 2003/0225693 A1 | 12/2003 | Ballard | |
| 2004/0187037 A1 | 9/2004 | Checco | |
| 2004/0193415 A1* | 9/2004 | Chaudhari | G10L 17/06 704/246 |
| 2005/0027528 A1* | 2/2005 | Yantorno | G10L 17/02 704/246 |
| 2006/0057550 A1 | 3/2006 | Sahashi | |
| 2006/0206724 A1* | 9/2006 | Schaufele | G06F 21/32 713/186 |
| 2008/0280269 A1* | 11/2008 | Yeung | G09B 19/04 434/157 |
| 2009/0027498 A1* | 1/2009 | Owen | H04N 7/183 348/151 |
| 2009/0103739 A1* | 4/2009 | Strait | G07C 9/00142 381/56 |
| 2009/0150992 A1 | 6/2009 | Kellas-Dicks et al. | |
| 2010/0088097 A1* | 4/2010 | Tian | G10L 15/07 704/251 |
| 2010/0097178 A1 | 4/2010 | Pisz et al. | |
| 2010/0114367 A1 | 5/2010 | Barrett | |
| 2011/0016240 A1 | 1/2011 | Mills | |
| 2011/0243449 A1* | 10/2011 | Hannuksela | G06K 9/00221 382/190 |
| 2011/0258689 A1* | 10/2011 | Cohen | H04L 63/061 726/7 |
| 2011/0276323 A1* | 11/2011 | Seyfetdinov | G06F 21/32 704/207 |
| 2012/0235912 A1 | 9/2012 | Laubach | |
| 2012/0244510 A1* | 9/2012 | Watkins, Jr. | G09B 7/00 434/362 |
| 2012/0246737 A1* | 9/2012 | Paxton | G06F 21/316 726/27 |
| 2012/0256967 A1* | 10/2012 | Baldwin | G06F 3/013 345/684 |
| 2013/0015946 A1* | 1/2013 | Lau | G07C 9/00 340/5.2 |
| 2013/0055371 A1 | 2/2013 | Kumano | |
| 2013/0055381 A1* | 2/2013 | Hao | G06F 21/316 726/18 |
| 2013/0227678 A1* | 8/2013 | Kang | G06F 21/32 726/19 |
| 2013/0243207 A1* | 9/2013 | Liu | G10L 15/02 381/56 |
| 2013/0308855 A1 | 11/2013 | Li | |
| 2014/0015930 A1 | 1/2014 | Sengupta | |
| 2014/0016823 A1* | 1/2014 | Ye | G06T 19/20 382/103 |
| 2014/0022249 A1* | 1/2014 | Ye | G06T 13/40 345/420 |
| 2014/0049563 A1* | 2/2014 | Tobin | G06F 3/012 345/649 |
| 2014/0075570 A1 | 3/2014 | Hsu et al. | |
| 2014/0279211 A1 | 9/2014 | Bruber | |
| 2014/0351914 A1 | 11/2014 | Suresh | |
| 2015/0130716 A1* | 5/2015 | Sridharan | G06F 3/0304 345/158 |
| 2015/0242978 A1 | 8/2015 | Zaslavsky | |
| 2015/0262496 A1 | 9/2015 | Cook | |
| 2016/0019415 A1* | 1/2016 | Ra | G06T 7/73 382/197 |
| 2016/0065558 A1 | 3/2016 | Suresh | |

OTHER PUBLICATIONS

Garcia-Perera LP et al: "Multi-speaker voice cryptographic key generation", Computer Systems and Applications, 2005. The 3$^{rd}$ ACS/IEEE International Conference on Cairo, Egypt Jan. 3-6, 2005, Piscataway, NJ, USA, IEEE, Jan. 3, 2005, pp. 487-493.

Qi Li et al: "Automatic Verbal Information Verification for User Authentication", IEEE Transactions on Speech and Audio Processing, IEEE Service Center, New York, NY, US, vol. 8, No. 5, Sep. 1, 2000.

Qian Tao et al: "Biometric Authentication System on Mobile Personal Devices", IEEE Transactions on Instrumentation and Measurement, IEEE Service Center, Piscataway, NJ, US, vol. 59, No. 4, Apr. 1, 2010, pp. 763-773.

Ahmed Zeeshan Pervaiz: "Real Time Face Recognition System Based on EBGM Framework", Computer Modelling and Simulation (UKSIM), 2010 12$^{th}$ International Conference on, IEEE, Piscataway, NJ, USA, Mar. 24, 2010, pp. 262-266.

Zi Chu et al: "Blog or block: Detecting blog bots through behavioral biometrics", Computer Networks, vol. 57, No. 3, Feb. 1, 2013, pp. 634-646.

* cited by examiner

```
input:  A KeyPress event                                              801
output: A collection containing the Flight, Dwell, and DownDown
        times for each KeyPress event KeyPressStruct() {
    lastKey = Last Key pressed
    curKey = Current key pressed
    dwellStart = The time at which the current key was pressed
    flight [ ] = all flight times for this key pair
    downDown [ ] = All downDown times for this key pair
    dwell [ ] = All dwell times for this key pair
}
for each KeyPress do
    if KeyPress == KeyDown then
        Special case: Ignore the first KeyDown event create new KeyPressStruct in tempBuffer
        tempBuffer[last].lastKey = lastKeyDown
        tempBuffer[last].curKey = KeyPress
        tempBuffer[last].downDown = now - downDownTime
        tempBuffer[last].dwellStart = now if lastKeyDown == lastKeyUp then
            tempBuffer[last].flight = now - flightTime
        end lastKeyDown = KeyPress
        downDownTime = now
    end
    else if KeyPress == KeyUp then
        if KeyPress == tempBuffer[i].curKey then
            tempBuffer[i].dwell = now - tempBuffer[i].dwellStart
            if tempBuffer[i].flight != null then
                push tempBuffer[i] → mainBuffer[KeyPress]
                remove tempBuffer[i]
            end
        end
        if KeyPress == tempBuffer[i].lastKey then
            tempBuffer[i].flight = tempBuffer[i].dwellStart - now
            if tempBuffer[i].dwell != null then
                push tempBuffer[i] → mainBuffer[KeyPress]
                remove tempBuffer[i]
            end
        end
        lastKeyUp = KeyPress
        flightTime = now
    end
end
```

Fig. 8

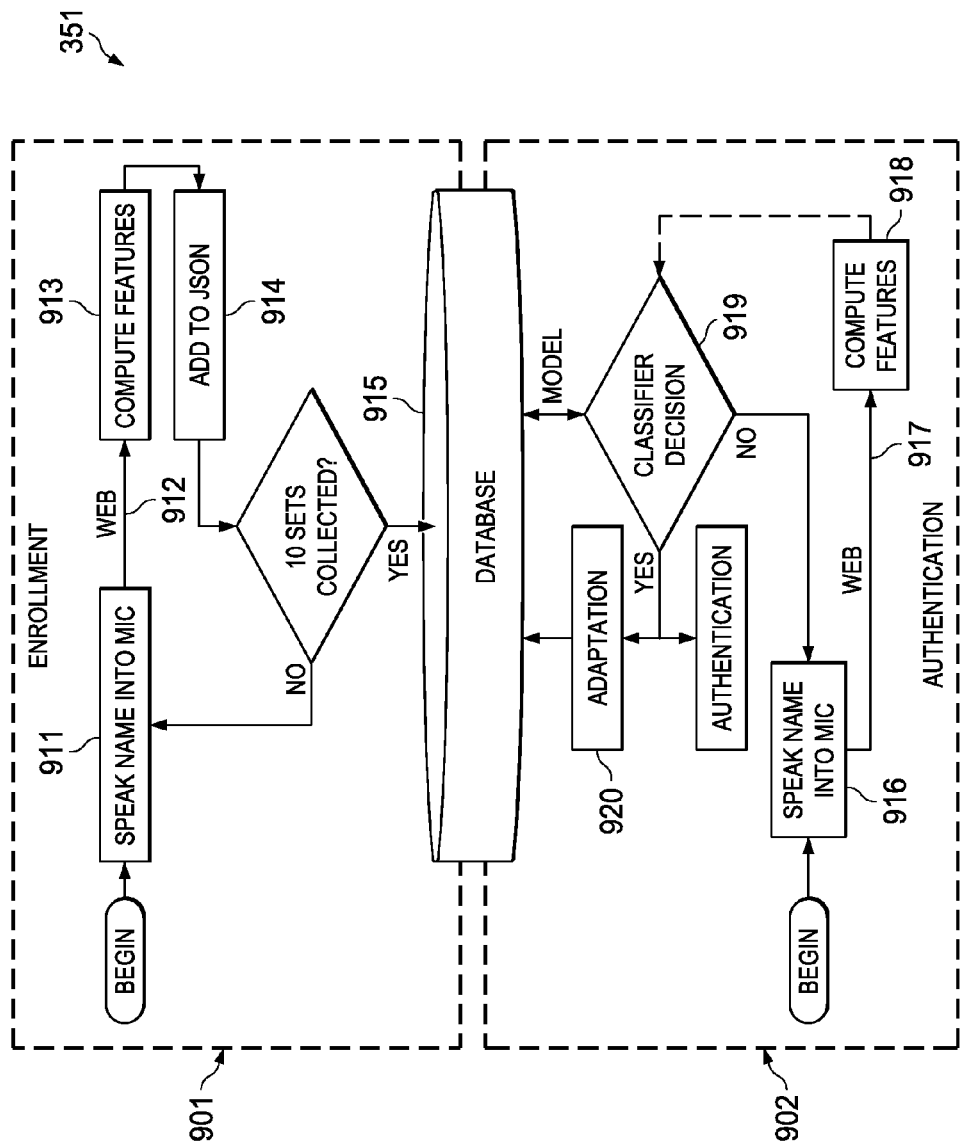

USER IDENTITY AUTHENTICATION TECHNIQUES FOR ON-LINE CONTENT OR ACCESS

CROSS-REFERENCE

The present application claims benefit of U.S. Provisional Application No. 62/000,522, filed May 19, 2014, and is a continuation-in-part of U.S. application Ser. No. 14/659,118, filed Mar. 16, 2015, each naming Cook, Kapur, Vallis and Hochenbaum as inventors. Each of the foregoing applications is incorporated herein by reference.

BACKGROUND

Field of the Invention

The present application is related to user authentication and, in particular, to techniques for reliably authenticating student identity in the course of interactive submission of, or participation in, coursework.

Description of the Related Art

As educational institutions seek to serve a broader range of students and student situations, on-line courses have become an increasingly important offering. Indeed, numerous instances of an increasingly popular genre of on-line courses, known as Massive Open Online Courses (MOOCs), are being created and offered by many universities, as diverse as Stanford, Princeton, Arizona State University, the Berkeley College of Music, and the California Institute for the Arts. These courses can attract tens (or even hundreds) of thousands of students each. In some cases, courses are offered free of charge. In some cases, courses are offered for credit.

While some universities have created their own Learning Management Systems (LMS), a number of new companies have begun organizing and offering courses in partnership with universities or individuals. Examples of these include Coursera, Udacity, and edX. Still other companies, such as Moodle, offer LMS designs and services for universities who wish to offer their own courses.

Students taking on-line courses typically watch video lectures, engage in blog/chat interactions, and submit assignments, exercises, and exams. Submissions may be evaluated and feedback on quality of coursework submissions can be provided. In some cases, professional accreditation, university credit and/or proficiency recognition may be offered. To facilitate such new accredited delivery channels for educational content, technological solutions are needed. In particular, improved techniques are needed for reliably ascertaining or authenticating identity of a student user submitting assignments, exercises, and exams.

SUMMARY

It has been discovered that high-quality multimedia content of on-line course offerings can be made available to users using computational techniques that reliably authenticate the identity of individual student users during the course of the very submissions and/or participation that will establish student user proficiency with course content. In some embodiments, the authentication methods and systems described herein include applications of behavioral biometrics.

As used herein, the term "behavioral biometric" is used to distinguish itself from physiological biometrics (e.g., including DNA, fingerprints, hand geometry, iris, retinal, etc.). In some embodiments, behavioral biometrics may utilize a statistical confidence measurement, rather than a pass/fail type of measurement. In addition, behavioral biometrics may advantageously utilize time as a measurement parameter, in contrast to physiological biometrics. As such, examples of behavioral biometrics as used herein may include at least one of (i) audio features extracted from vocals of the user, (ii) visual features extracted from an image or video of the user, and (iii) dynamic keystroke features extracted from user keystrokes.

In some embodiments in accordance with the present invention(s), a multi-modal authentication method includes initially capturing an enrollment dataset of at least first- and second-type biometrics characteristic of a particular user and, subsequent to the initial capturing, simultaneously capturing by way of one or more computing device interfaces and in connection with the user's interactive response thereon, (i) a first dataset corresponding to the first-type biometric and (ii) a second dataset corresponding to the second-type biometric. The first-type biometrics include audio features extracted from vocals of the user, and the second-type biometrics include visual features extracted from an image or video of the user. The first and second datasets are coherent with each other, time-aligned and correspond to the same interactive response by the user. The method further includes computationally determining correspondence of the first- and second-type biometrics with the enrollment dataset and authenticating an identity of the user based on the determined correspondence (i) between the first- and second-type biometrics with the enrollment dataset and (ii) between the time-aligned audio and visual features.

In some embodiments, the correspondence determining further includes computationally determining correspondence between time-aligned ones of the audio and visual features respectively extracted from the vocals and image or video of the user in connection with the interactive response. In some embodiments, for the first-type biometrics, the correspondence determination includes comparison of Mel frequency cepstrum coefficients (MFCCs) or spectral sub-band centroids (SSCs) using a trained classifier. In some embodiments, for the second-type biometrics, the correspondence determination includes use of a local binary patterns histogram (LBPH) technique performed on an aligned, cropped and illumination-adjusted image.

In some embodiments, the method further includes performing the capturing of the enrollment dataset using the one or more computing device interfaces and in connection with the user's interactive response thereon. In some cases or embodiments, the interactive user responses are responsive to an on-screen game or task. In some cases or embodiments, the first and second datasets are captured covertly in connection with the interactive user responses.

In some cases or embodiments, the audio features extracted from vocals of the user include at least one of a frequency domain spectrum of the vocals of the user, a pitch of the vocals of the user, power of the vocals of the user, a tone of the vocals of the user, and a cadence of the vocals of the user. In some cases or embodiments, the visual features extracted from an image or video of the user include at least one of position and movement of one or more respective facial features of the user.

In some embodiments, the method further includes computationally determining a lack of correspondence between either or both of (i) the enrollment dataset and the first- or second-type behavioral biometrics and (ii) the time-aligned audio and visual features and responsive to the determined lack of correspondence (i) presenting the user with supplemental identity validation task and capturing the user's response thereto and (ii) authenticating the identity of the user based on the captured user response to the supplemental identity validation task.

In some cases or embodiments, the supplemental identity validation task includes speaking a passphrase. In some cases or embodiments, the supplemental identity validation task includes typing a passphrase and the identity authenticating includes computationally evaluating correspondence of captured key sequence timings with key sequence timings previously captured for, and previously determined to be, characteristic of the user.

In some embodiments in accordance with the present invention(s), an authentication method includes capturing, by way of a first computing device or an audio interface thereof, vocals of a particular user; extracting a first sequence of audio features from the captured vocals, wherein the first sequence of extracted audio features corresponds to a training speech sequence voiced by the particular user and includes one or more of spectra, power, pitch, tone, and cadence features extracted over the temporal course of the voiced training sequence; and storing for the particular user, in a biometric store remote from the computing device, an audio biometric based on the first sequence of extracted audio features. Thereafter, by way of a second computing device or an audio interface thereof, the method captures authentication vocals from a user who purports to be the particular user and extracts a second sequence of audio features from the captured authentication vocals, wherein the second sequence of extracted audio features includes at least a subset of the audio features of the first sequence. Using a computational classifier hosted remote from the first and second computing devices, the method determines whether the extracted second sequence of audio features corresponds to the audio biometric of the particular user and sufficiently discriminates audio biometrics stored for a statistically significant set of other users, and if so, authenticates identity of the first user as the particular user for access to content or resources.

In some cases or embodiments, the audio biometric is determined using K-means clustering to create a codebook of centroids from at least a subset of the audio features of the first sequence. In some cases or embodiments, the authenticating is performed in the course of a coursework submission. In some cases or embodiments, the first and second computing devices are the same device. In some cases or embodiments, the first and second computing devices are different devices.

In some embodiments in accordance with the present invention(s), an authentication method includes (i) capturing a training set of key sequences entered by a particular user at a computing device or interface, wherein information captured for the key sequences of the training set includes both key entry orderings and timing information; (ii) from the captured key sequences of the training set, computationally evaluating at least the timing information for keyed subsequences appearing in the captured key sequences and thereby determining a set of keyed subsequences for which timing information provides a keying biometric characteristic of the particular user and suitable to discriminate keying by the particular user from keying of a statistically significant set of other users; and (iii) storing the keying biometric for use in future authentication of the particular user based on authentication sets of key sequences entered by the particular user, wherein authentication sets of key sequences do not directly correspond to the training set of key sequences, but share the keying subsequences that the computational evaluation of at least timing information determined provide the keying biometric. In some cases or embodiments, the timing information for keyed subsequences includes at least dwell and flight times for key pairs.

In some embodiments, the method further includes generating, based on the stored keying biometric, and supplying a challenge to a user who purports to be the particular user, wherein the challenge solicits key entry at a computing device or interface and wherein the solicited key entry includes the keying subsequences that the computational evaluation of at least timing information determined provide the keying biometric.

In some embodiments, the method further includes computationally evaluating, based on the stored keying biometric, keying subsequences keyed, in the course of an interactive session, by a user at a computing device or interface and, based on correspondence with the keying biometric, authenticating or confirming authentication of the particular user. In some embodiments, the method further includes performing, at successive times throughout the interactive session, the computational evaluating of keying subsequences for correspondence with the keying biometric. In some cases or embodiments, the training set capture is covert.

In some embodiments, the method further includes capturing the authentication sets of key sequences from content keyed, in ordinary course of an interactive session, by a user who purports to be the particular user. In some embodiments, the method further includes performing (i) the training set capture and (ii) the determination of keyed subsequences for which timing information provides a keying biometric in a networked computing environment wherein a user enters keystrokes at a client user interface system as part of a session with a remote, network connected service platform; and communicating, from the client user interface system to the remote, network connected service platform, the timing information for keyed subsequences appearing in the captured key sequences.

In some embodiments in accordance with the present invention(s), an authentication method includes capturing, at a first computing device or keying interface thereof, timing information for a training sequence of keyings entered by a particular user, wherein the captured timing information includes one or more of Flight, Dwell and DownDown times for at least selected key pairs appearing in the training sequence; and computationally evaluating at least the captured timing information and thereby determining a set of the key pairs for which captured timing information provides a keying biometric characteristic of the particular user and suitable to discriminate keying by the particular user from keying of a statistically significant set of other users. The method includes storing, for the particular user, the keying biometric in a biometric store; and thereafter, supplying a challenge to a first user who purports to be the particular user; wherein the supplied challenge solicits entry of an authentication passphrase tailored to the particular user in that the authentication passphrase includes key pairs from the set determined, in the computational evaluation of captured timing information, to provide the keying biometric characteristic of the particular user.

In some embodiments, the method further includes preparing a first passphrase based on the key pairs from the set previously determined to provide the keying biometric characteristic of the particular user. In some embodiments, the method further includes supplying the first passphrase to the particular user for subsequent entry as the authentication passphrase. In some embodiments, the method further includes supplying the first passphrase as at least part of the challenge and for entry, by the user, as the authentication passphrase.

In some embodiments, the method further includes capturing, at a second computing device or keying interface thereof, timing information for a keying of the authentication passphrase by the first user; and computing a statistically-based distance metric comparing the captured timing information for the keying of the authentication passphrase with the keying biometric characteristic of the particular user and, based on correspondence therebetween, authenticating identity of the first user as the particular user for access to content or resources. In some cases or embodiments, the first and second computing devices are same devices. In some cases or embodiments, the first and second computing devices are different devices.

In some embodiments in accordance with the present invention(s), an authentication method includes capturing, by way of a computing device or an audio interface, a sequence of audio features extracted from vocals of a particular user, wherein the captured sequence of audio features corresponds to a training speech sequence, and wherein the captured sequence of audio features includes one or more of a frequency domain spectrum, a pitch, a power, a tone, and a cadence of the vocals of the particular user. The method further includes capturing, by way of the computing device or an image or video interface, a sequence of visual features extracted from an image or video of the particular user, wherein the captured sequence of visual features includes one or more facial movements corresponding to the captured sequence of audio features. From the captured sequence of corresponding audio and visual features, the method computationally evaluates at least a portion of the training speech sequence including computational evaluation of the corresponding facial movements and the one or more of the frequency domain spectrum, the pitch, the power, the tone, and the cadence of the vocals of the particular user, thereby determining an audio-visual biometric characteristic of the particular user and suitable to discriminate the training speech sequence spoken by the particular user from the training speech sequence spoken by a statistically significant set of other users. Finally, the method stores the audio-visual biometric for use in future authentication of the particular user based on an authentication speech sequence spoken by the particular user, wherein the authentication speech sequence does not directly correspond to the training speech sequence, but shares the computationally evaluated portion of the training speech sequence determined to provide the audio-visual biometric.

In some embodiments, the method further includes generating, based on the stored audio-visual biometric, and supplying a challenge to a user who purports to be the particular user, wherein the challenge solicits speech entry at a computing device or interface and wherein the solicited speech entry includes the portion of the training speech sequence that the computational evaluation of the corresponding facial movements and the one or more of the frequency domain spectrum, the pitch, the power, the tone, and the cadence of the vocals of the particular user determined provide the audio-visual biometric.

In some embodiments, the method further includes computationally evaluating, based on the stored audio-visual biometric, portions of speech sequences, in the course of an interactive session, by a user at a computing device or interface and, based on correspondence with the audio-visual biometric, authenticating or confirming authentication of the particular user. In some embodiments, the method further includes performing, at successive times throughout the interactive session, the computational evaluating of portions of speech sequences for correspondence with the audio-visual biometric. In some cases or embodiments, the computational evaluating, at successive times throughout the interactive session, of portions of speech sequences for correspondence with the audio-visual biometric is covert.

In some embodiments, the method further includes capturing the sequence of corresponding audio and visual features corresponding to the authentication speech sequence, in ordinary course of an interactive session, by a user who purports to be the particular user. In some embodiments, the method further includes performing (i) capture of the corresponding sequences of audio and visual features and (ii) the determination of the portion of the training speech sequence determined to provide the audio-visual biometric in a networked computing environment wherein a user enters speech at a client user interface system as part of a session with a remote, network connected service platform; and communicating, from the client user interface system to the remote, network connected service platform, the facial movements and the corresponding one or more of the frequency domain spectrum, the pitch, the power, the tone, and the cadence of the vocals of the particular user for the portion of the training speech appearing in the captured sequence of corresponding audio and visual features.

In some embodiments in accordance with the present invention(s), an authentication method includes generating and supplying, at a computing device or interface, an on-screen target in a first position and an on-screen aiming mechanism used for aiming at the on-screen target in the first position; and capturing, by way of a computing device having or interface coupled to an image sensor directed toward a particular user, motion of visual features including gross user motion or fine user motion including motion of one or more facial features. Based on the captured motion of the visual features, the method moves the on-screen aiming mechanism correspondingly to, in magnitude and direction, the captured motion of the visual features, wherein the motion of the visual features and corresponding movement of the on-screen aiming mechanism brings the on-screen aiming mechanism into at least a partially overlapping alignment with the on-screen target in the first position. With the on-screen aiming mechanism in the at least partially overlapping alignment with the on-screen target in the first position, the method captures by way of the computing device or interface, an image of the particular user in a first position, wherein the image of the particular user in the first position is computationally evaluated and a corresponding first position score is generated, where the generated first position score is used for user recognition and authentication.

In some embodiments, the method further includes detecting and tracking facial landmarks in image sequences captured with the image sensor, wherein movement of the on-screen aiming mechanism is in correspondence with the tracking of one or more of the facial landmarks across a captured visual field.

In some embodiments, the method further includes moving the on-screen aiming mechanism, based on the captured motion of the visual features, into at least a partially overlapping alignment with the on-screen target in a second position; and with the on-screen aiming mechanism in the at least partially overlapping alignment with the on-screen target in the second position, capturing, by way of the computing device or interface, an image of the particular user in a second position, wherein the image of the particular user in the second position is computationally evaluated and a corresponding second position score is generated, where the generated second position score is used for user recognition and authentication.

In some embodiments, the method further includes processing, by way of the computing device or interface, the generated first and second scores; determining that the processed first and second scores satisfy a threshold confidence level; and authenticating an identity of the particular user based on the processed first and second scores satisfying the threshold confidence level.

In some embodiments, the method further includes setting a user identification for the particular user; capturing, by way of the computing device or interface, an image of the particular user in a first training position, wherein the image of the particular user in the first training position is computationally evaluated and a corresponding first training position score is generated, where the generated first training position score is used for user recognition and authentication; capturing, by way of the computing device or interface, an image of the particular user in a second training position, wherein the image of the particular user in the second training position is computationally evaluated and a corresponding second training position score is generated, where the generated second training position score is used for user recognition and authentication; and storing a visual biometric based at least in part on the generated first and second training position scores, wherein the visual biometric corresponds to the user identification for the particular user.

BRIEF DESCRIPTION OF THE DRAWINGS

The present invention(s) are illustrated by way of example and not limitation with reference to the accompanying drawings, in which like references generally indicate similar elements or features.

FIG. 8 depicts code suitable for key sequence timing-type feature extraction to facilitate authentication of user identity in some coursework management system embodiments of the present invention(s).

FIG. 9 is a flowchart depicting an algorithm executable in, or in connection with, voice-type audio feature extraction and classification operations to authenticate identity of a particular user consistent with the flows depicted in FIG. 3.

DESCRIPTION

Figure 1:
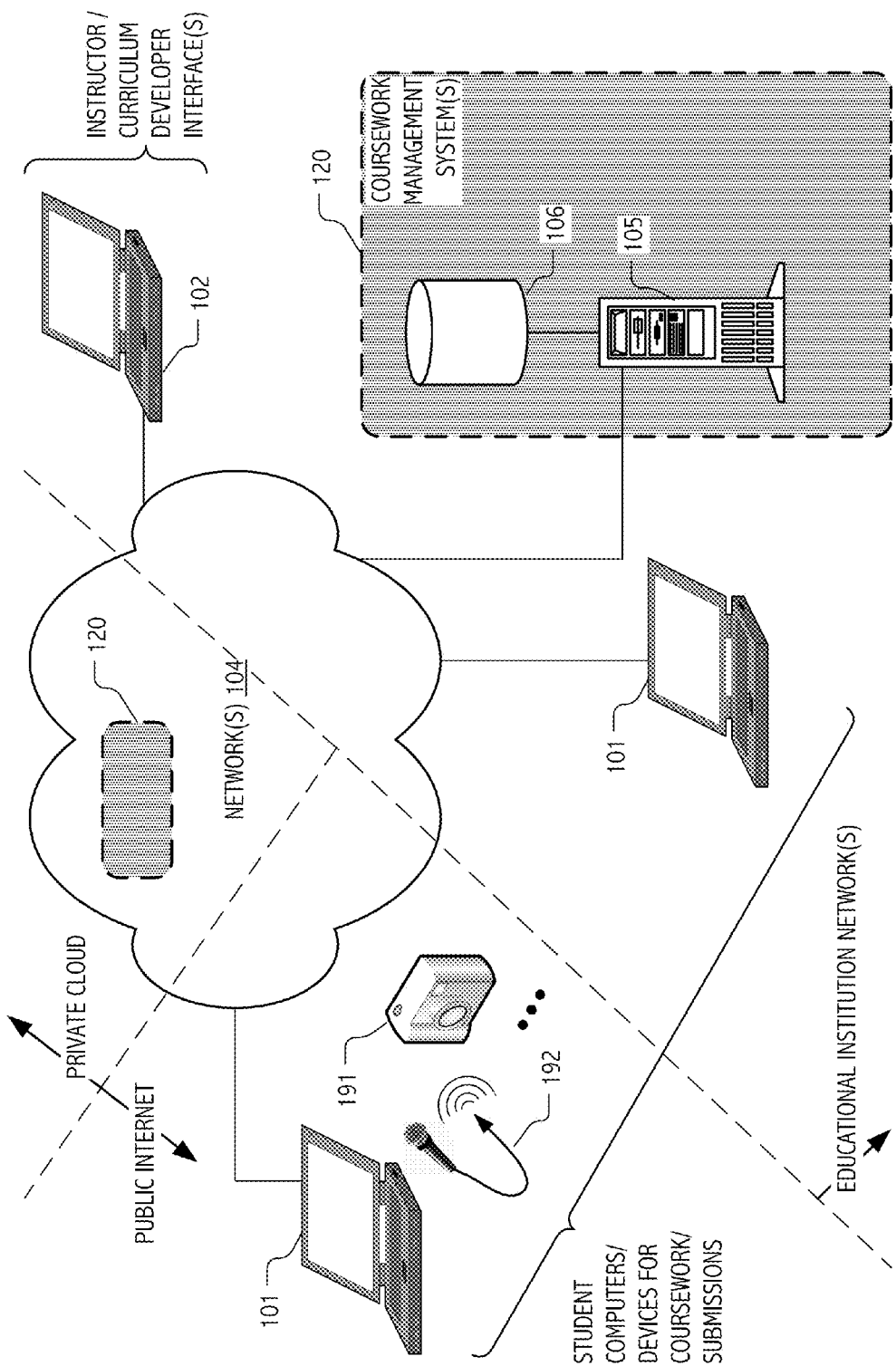
FIG. 1 depicts an illustrative networked environment including a coursework management system that provides student users with multimedia educational content and which may, in accordance with some embodiments of the present invention(s), authenticate identity of users based on features extracted from interactive responses.

The solutions described herein address problems newly presented in the domain of educational coursework, administration and testing, such as for on-line courses offered for credit to large and geographically dispersed collections of students (e.g., over the Internet), using technological solutions including computational techniques for feature extraction and student user authentication based on captured features of student responses to interactive content. In some cases or embodiments, timing of keystroke sequences captured in the course of typed responses and/or computationally-defined audio (e.g., vocal) and/or image/video (e.g., facial) features captured via microphone or camera may be used to reliably authenticate identity of a student user. In this way, coursework submissions (e.g., test, quizzes, assignments, participation in class discussions, etc.) may be auto-proctored in a manner that allows sponsoring institutions to provide or assign credit and credence to student performance.

We envision on-line course offerings that are available to users on both (1) a free-of-direct-charge basis and (2) a fee-bearing subscription, member or for-credit basis. In general, student-users can avail themselves of university-level, credit-granting courses online. They can watch the lectures for free. In some cases, student-users can even do the assignments and participate in the discussion forums. However, if they want their assignments graded and/or if they want other premium benefits, reliable authentication of the identity of a student user can be important.

Premium benefits can include instructor- or teaching assistant-based feedback on coursework submissions, member or "for-credit" student status in discussion forums, discounts on software, hardware, text books, etc. In some cases, premium member/subscriber tier benefits may include the reporting of a verifiable level of achievement to an employer or university (e.g., John Q. Student finished $5^{th}$, or in the $5^{th}$ percentile, in *Introduction to Multiplayer Game Development and Coding*, offered by a particular and prestigious university) or as a certification mark for an on-line resume, professional networking site or job-recommendation service.

Member/subscriber tier premium benefits may, in some cases, include the ability to take course(s) for actual university credit, even as a high-school student or younger. As a result, and in some cases, Advanced Placement courses, exams, and credit start to look less attractive in comparison to actual credit that can transfer into or across schools. Likewise, in some embodiments, premium benefits may include continuing legal or medical education credit, engineering or accounting profession certifications or the like.

For at least some of these premium services, technological solutions are needed or desirable to implement a membership system and/or to auto-proctor coursework submissions and reliably authenticate identities of users in the course of coursework submissions and/or class participation. Preferably, biometrically-based authentication techniques are used to reduce risks of student impersonators and "hired-gun" or proxy test taker schemes to procure credit. Due to the interactive nature of coursework submissions and class participation, and due to the general absence of practical physical location and physical presence based proctoring options for on-line courses, we tend to emphasize biometrics that can be captured from or extracted from actual coursework submissions and/or on-line class participation. For example, computational processing of:

(i) key sequence timings captured in connection with the interactive responses by the individual users;

(ii) audio features extracted from user vocals captured in connection with the interactive responses; and/or (iii) images or video of the individual users captured in connection with the interactive responses, may be employed to reliably authenticate the identity of the actual student user during the course of the very submissions and/or participation that will establish student user proficiency with course content. In many cases, authentication (and indeed the collection of student user characteristic biometrics) is covert and need not be readily apparent to the student user.

In addition, the interactive user responses may responsive to an on-screen game, quiz, or task, thereby helping to conceal the authenticating function from the user. In some embodiments, if a user cannot be reliably authenticated using one of the behavioral biometric techniques described herein, an on-screen validation task or window may appear, prompting the user to input a passphrase or speak a passphrase, in order to confirm their identity and/or to confirm that they are an authorized user. In some embodiments, behavioral biometric datasets may be continuously captured during a user's session to validate the user.

In some embodiments, authentication by way the behavioral biometric techniques described herein includes computationally determining a correspondence between captured audio features extracted from vocals of the user and captured visual features extracted from an image or video of the user. In other words, such embodiments seek to find a correspondence between movements of facial features (e.g., lips, eyes, cheeks, etc.) and the words that are being spoken.

In some embodiments, prior to implementing one of the behavior biometric authentication techniques described herein, a user may establish a baseline identifying behavioral biometric dataset by "training" the authentication system, where the baseline identifying behavioral biometric dataset can be saved in a user profile database. Such a baseline identifying behavioral biometric dataset may be recalled at a later time, for comparison for example to a currently collected user dataset, in order to confirm that a particular user is who he/she purports to be. In some embodiments, the baseline identifying set may include one or more of audio features, visual features, or dynamic keystroke features. In some embodiments, the user profile database may be stored in a local computer system. In other embodiments, the user profile database may be stored in a remote computer, in communication with a user local computer or interface via a network connection. In addition, in the various embodiments described herein, the user device or interface at which a behavioral biometric is captured (e.g., a client computer) need not be the same device at which processing/comparison of the behavioral biometric data for user authentication is performed. In some embodiments, processing and/or comparison against a stored characteristic (e.g., baseline identifying behavioral biometric dataset) may be done at a network-based service provider rather than at the user system or device.

Note that in many cases and implementations, in addition to the member/subscriber tier premium benefits provided to authenticable users, unauthenticated "auditing" of course content may also (and typically will) be provided, though not for credit, employer reporting, certification, etc. In some cases, authenticated member/subscriber tier users may be offered the opportunity to "wait-and-see" how they perform, before requesting actual university credit, employer reporting or certification.

In general, users do not just watch videos. Instead, multimedia lesson content typically will include quizzes or other coursework requiring interactive responses. Quizzes and other coursework are typically embedded in a lesson or presented between lessons. In some cases, automated grading technology tracks student progress, possibly not letting a student progress to the next lesson/video until he or she has proven some level of mastery by way of interactive responses. In some cases the system may simply require the user to demonstrate that he or she has paid attention, again by way of interactive responses. In each case, features captured or extracted from the interactive responses (or at least from some of the interactive responses) may be computationally evaluated for correspondence with biometrics characteristic of the member/subscriber tier user that the user purports to be.

In general, member/subscriber tier users participating for credit must complete the assignments, finish the course, and possibly even participate in user forums. Although different implementations may employ different completion criteria, on balance, many implementations will seek to achieve some balance between ensuring that interested students are retained and assuring sponsoring institutions both that the retained active students really participated in their course(s) and that, for each such active student, his/her identity has been reliably authenticated throughout interactive submissions (including graded quizzes, test and other coursework). For credit, criteria typically include completion of all the interactive response requiring coursework/assignments and demonstrating target levels of proficiency by way of interactive quizzes and/or exams. For member/subscribing users not participating for credit, some lesser set of criteria may be employed. Although any of a variety of exploitations are possible, users are reliably authenticable based on biometric information captured or extracted during the course of the very submissions and/or participation that establish student user proficiency with course content. In this way, fraud risks are greatly reduced.

Illustrative Coursework Management Systems

FIG. 1 depicts an illustrative networked information system in which students and instructors (and/or curriculum developers) interact with coursework management systems 120. In general, coursework management systems 120 such as described herein may be deployed (in whole or in part) as part of the information and media technology infrastructure (networks 104, servers 105, workstations 102, database systems 106, including e.g., audiovisual content creation, design and manipulation systems, code development environments, etc. hosted thereon) of an educational institution, testing service or provider, accreditation agency, etc. Coursework management systems 120 such as described herein may also be deployed (in whole or in part) in cloud-based or software-as-a-service (SaaS) form.

In some implementations or deployments and/or for some types of coursework, students interact with audiovisual content creation, design and manipulation systems, code development environments, etc. deployed (in whole or in part) on user workstations 101 and/or within the information and media technology infrastructure. In many cases, audio-visual performance and/or capture devices (e.g., still or motion picture cameras 191, microphones 192, 2D or 3D scanners, musical instruments, digitizers, etc.) may be coupled to or accessed by (or from) user workstations 101 in accordance with the subject matter of particular coursework and curricula. In some situations, implementations or deployments, audio visual capture devices (e.g., still or motion picture camera 191 and microphone 192, embodied as a webcam or similar facility) support user authentication as described herein.

Figure 2:
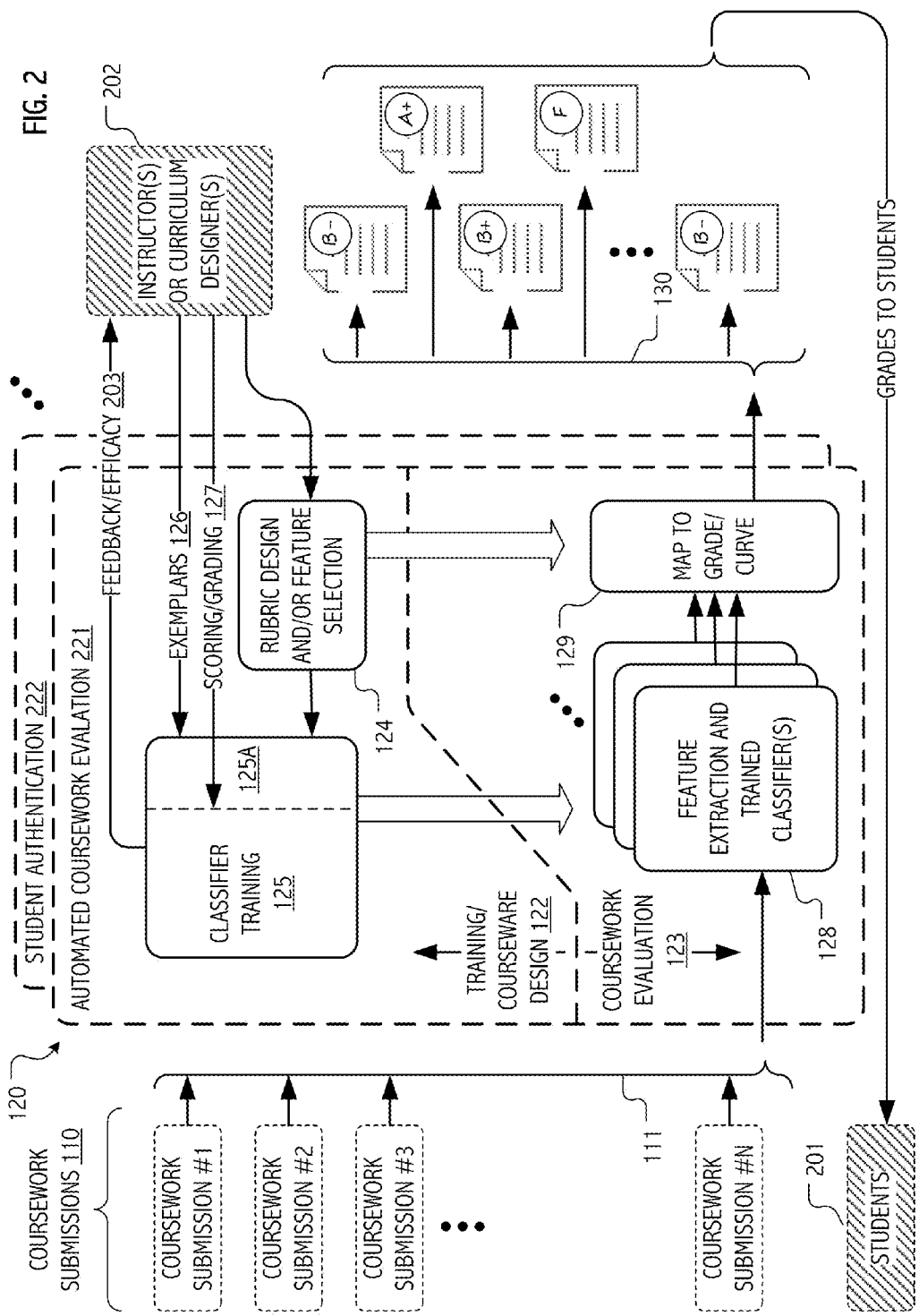
FIG. 2 depicts data flows for, interactions with, and operational dependencies of, various components of a coursework management system such as that depicted in FIG. 1 which, in some embodiments, may provide automated coursework evaluations for test, quiz or other coursework submission from at least a subset of users whose identities have been reliably authenticated.

FIG. 2 depicts data flows, interactions with, and operational dependencies of various components of an instance of coursework management system 120 that includes an automated coursework evaluation subsystem 221 and a student authentication subsystem 222 in accordance with some embodiments of the present invention(s).

Automated coursework evaluation subsystem 221 includes a training/courseware design component 122 and a coursework evaluation component 123. An instructor and/or curriculum designer 202 interacts with the training/courseware design component 122 to establish (for given coursework such as a test, quiz, homework assignment, etc.) a grading rubric (124) and to select related computationally-defined features (124) that are to be used to characterize quality or scoring (e.g., in accordance with criteria and/or performance standards established in the rubric or ad hoc) for coursework submissions by students.

For example, in the context of an illustrative audio processing assignment, a rubric may define criteria including distribution of audio energy amongst selected audio sub-bands, degreeor quality of equalization amongst sub-bands, degree of panning for mixed audio sources and/or degree or quality of signal compression achieved by audio processing. In the context of an illustrative image or video processing assignment, a rubric may define criteria for tonal or chromatic distributions, use of focus or depth of field, point of interest placement, visual flow and/or quality of image/video compression achieved by processing. Based on such rubrics, or in accord with ad hoc selections by instructor and/or curriculum designer 202, particular computationally-defined features are identified that will be extracted (typically) based on signal processing operations performed on media content (e.g., audio signals, images, video, digitized 3D surface contours or models, etc.) and used as input feature vectors in a computational system implementation of a classifier. Instructor and/or curriculum designer 202, also supplies (or selects) media content exemplars 126 and scoring/grading 127 thereof to be used in classifier training 125, and classifier training 125 provides feedback/efficacy 203 to instructor and/or curriculum designer 202.

Note that while certain types of curricula or assignments may involve coursework submissions that include audio, visual or multimedia content, others need not. For example, curricula and assignments for algebra, European history or English literature courses would not typically require audio-visual content as coursework submissions. Accordingly, rubrics for such curricula and assignments may be more conventional.

In general, any of a variety of classifiers may be employed in accordance with statistical classification and other machine learning techniques that exhibit acceptable performance in clustering or classifying given data sets. Suitable and exemplary classifiers are identified herein, but as a general proposition, in the art of machine learning and statistical methods, an algorithm that implements classification, especially in concrete and operative implementation, is commonly known as a "classifier." The term "classifier" is sometimes also used to colloquially refer to the mathematical function, implemented by a classification algorithm that maps input data to a category. For avoidance of doubt, a "classifier," as used herein, is a concrete implementation of statistical or other machine learning techniques, e.g., as one or more of code executable on one or more processors, circuitry, artificial neural systems, etc. (individually or in combination) that processes instances explanatory variable data (typically represented as feature vectors extracted from instances of data) and groups the instances into categories based on training sets of data for which category membership is known or assigned a priori.

In the terminology of machine learning, classification can be considered an instance of supervised learning, i.e., learning where a training set of correctly identified observations is available. A corresponding unsupervised procedure is known as clustering or cluster analysis, and typically involves grouping data into categories based on some measure of inherent statistical similarity uninformed by training (e.g., the distance between instances, considered as vectors in a multi-dimensional vector space). In the context of the presently claimed invention(s), classification is employed. Classifier training is based on instructor and/or curriculum designer inputs (exemplary media content and associated grading or scoring), feature vectors used characterize data sets are selected by the instructor or curriculum designer (and/or in some cases established as selectable within a training/courseware design module of an automated coursework evaluation system), and data sets are, or are derived from, coursework submissions of students.

Based on rubric design and/or feature selection 124 and classifier training 125 performed (in training/courseware design component 122) using instructor or curriculum designer 202 input, feature extraction techniques and trained classifiers 128 are deployed to coursework evaluation component 123. In some cases, a trained classifier is deployed for each element of an instructor or curriculum designer defined rubric. For example, in the audio processing example described above, trained classifiers may be deployed to map each of the following: (i) distribution of audio energy amongst selected audio sub-bands, (ii) degree or quality of equalization amongst sub-bands, (iii) degree of panning for mixed audio sources and (iv) degree or quality of signal compression achieved by audio processing to quality levels or scores based on training against audio signal exemplars. Likewise, in the image/video processing example described above, trained classifiers may be deployed to map each of the following: (i) distribution of tonal or chromatic values, (ii) focus or depth of field metrics, (iii) positioning or flow with a visual field of computationally discernible points/regions of interest and (iv) degree or quality of image/video compression to quality levels or scores based on training against image or video content exemplars. In some cases, features extracted from media-rich content 111 that constitutes, or is derived from, coursework submissions 110 by students 201 are used as inputs to multiple of the trained classifiers. In some cases, a single trained classifier may be employed, but more generally, outputs of multiple trained classifiers are mapped to a grade or score (129), often in accordance with curve specified by the instructor or curriculum designer.

Resulting grades or scores 130 are recorded for respective coursework submissions and supplied to students 201. Typically, coursework management system 120 includes some facility for authenticating students, and establishing, to some reasonable degree of certainty, that a particular coursework submission 110 is, in fact, submitted by the student who purports to submit it. Student authentication may be particularly important for course offered for credit or as a condition of licensure.

In some embodiments of coursework management system 120 (see e.g., FIG. 2), an automated coursework evaluation subsystem 121 may cooperate with student authentication facilities, such as fraud/plagiarism detection. For example, if coursework submissions (ostensibly from different, separately authenticated students) exhibit exactly or nearly the same score(s) based on extracted computationally defined features and classifications, then fraud or plagiarism is likely and can be noted or flagged for follow-up investigation. Likewise, if a coursework submission exhibits exactly the same score(s) (again based on extracted computationally defined features and classifications) as a grading exemplar or model audio signal, image, video or other expressive media content supplied to the students as an example, then it is likely that the coursework submission is, in-fact, a submission of the example, rather than the student's own work. Based on the description herein, persons of skill in the art will appreciate these and other benefits of integrating student authentication and automated coursework evaluation facilities in some embodiments of a coursework management system.

While neither automated coursework evaluation, nor media-rich coursework such as described above, are essential in all cases, situations or embodiments in accord with the present invention(s), the above-described techniques are illustrative of techniques employed in at least some embodiments. Additional techniques are detailed in commonly-owned, co-pending U.S. application Ser. No. 14/461,310, filed 15 Aug. 2014, entitled "FEATURE EXTRACTION AND MACHINE LEARNING FOR EVALUATION OF IMAGE- OR VIDEO-TYPE, MEDIA-RICH COURSEWORK" and naming Kapur, Cook, Vallis, Hochenbaum and Honigman as inventors, the entirety of which is incorporated herein by reference.

Figure 3:
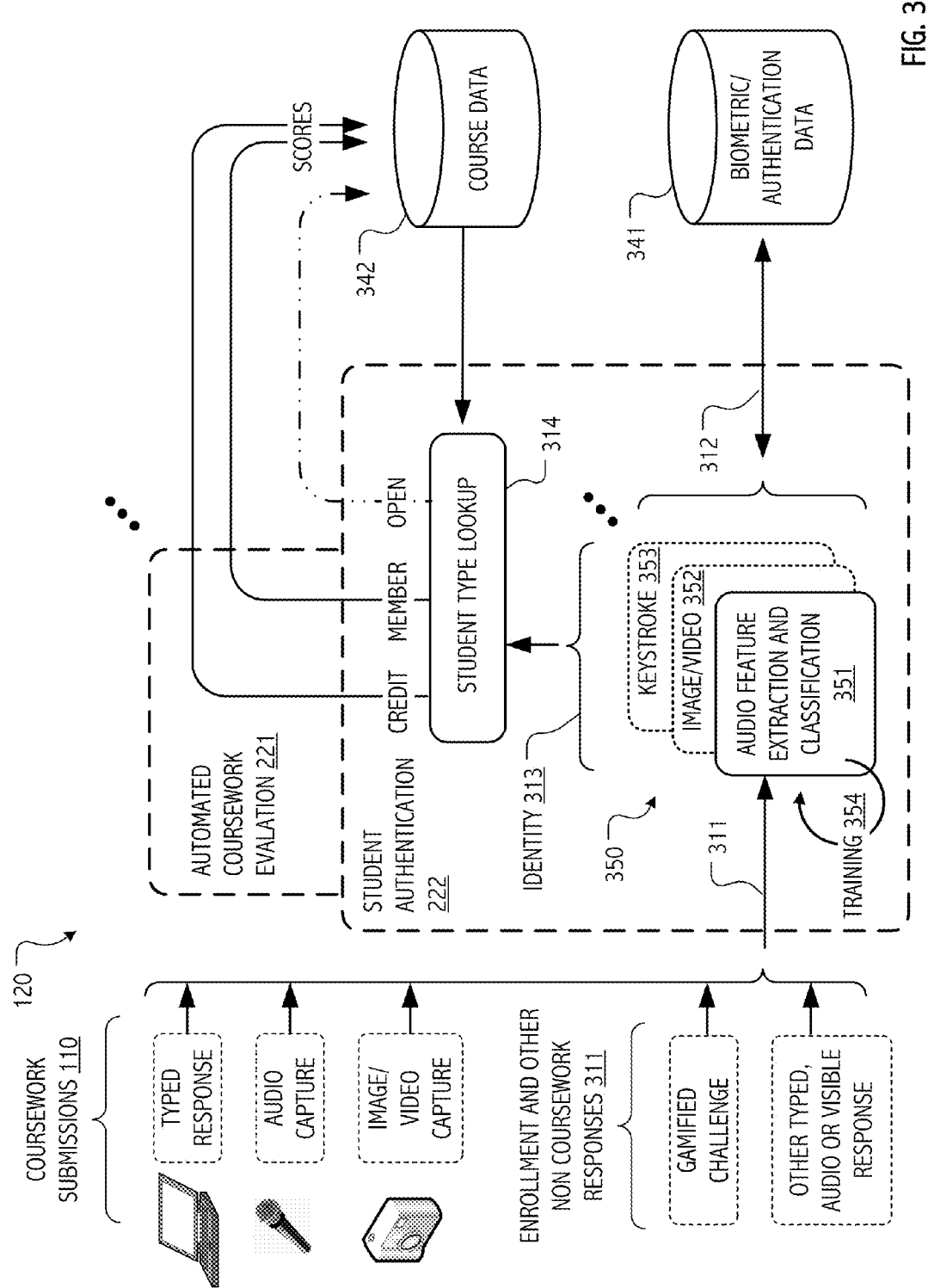
FIG. 3 depicts data flows for, interactions with, and operational dependencies of, various components of a coursework management system such as that depicted in FIG. 1 which, in some embodiments in accordance with the present invention(s), authenticates identity of at least a subset of student users based on features extracted from interactive responses from such users.

FIG. 3 depicts further data flows, interactions with, and operational dependencies of various components of an instance of coursework management system 120 that includes the above-described automated coursework evaluation subsystem 221 as well as a student authentication subsystem 222 in accordance with some embodiments of the present invention(s). Like automated coursework evaluation subsystem 221, student authentication subsystem 222 employs computational techniques to extract features from user content and to perform classification. However, unlike the feature extraction and classification (125/125A) performed in automated coursework evaluation subsystem 221, the features selected for extraction and classification in student authentication subsystem 222 are biometrically indicative of identity of the user who submits particular coursework or otherwise responds to coursework supplied in coursework management system 120.

In general, any of a variety of biometrically indicative responses 311 may be employed by respective feature extraction and classification computations 350 to train (354) respective classifiers 350 and thereafter authenticate identify (311) of a student user. The set and usage (including, in some cases or embodiments, for multi-modal authentication) of particular features and classifiers is, in general, implementation dependent; however, in the illustrated implementation, features are extracted from one or more biometrically indicative responses 311 and processed using one or more of audio feature extraction and classification 351, image/video feature extraction and classification 352 and/or keystroke timing feature extraction and classification 353. Training (354) can be performed as part of a student enrollment process and/or during course administration. Resulting indicative data is stored (312) in biometric/authentication data store 341 for subsequent retrieval (312) and use in authentication.

Sets of computational features extracted from biometrically indicative responses 311 and particular classification techniques employed to authenticate identity (313) of a particular user are each described in greater detail below. Such authentication may be multi-modal in nature. On the other hand, multimodal techniques need not be employed in all cases, situations or embodiments, and single mode authentication of identity (313), e.g., based simply on audio feature extraction and classification 351, or image/video feature extraction and classification 352 or keystroke timing feature extraction and classification 353, may be desirable and effective in some embodiments. However, for purposes of descriptive context and without limitation, each such modality is illustrated in FIG. 3.

Also illustrated in FIG. 3 is a rich set of biometrically indicative responses 311 from which particular responses may be selected for feature extraction and classification. Such illustrative responses may include coursework (110) and/or non-coursework (310) responses. For example, coursework submissions (110) themselves, e.g., in the form of typed user responses, user vocals and/or still or moving images, may be captured in response to coursework supplied by coursework management system 120. Such responses, e.g., key sequences typed by the user, a voiced response by the user and/or image(s) of the user captured in the course of a submission, may contain biometrically indicative data that are extractable for classification and use in authenticating identity. In some cases, capture of biometrically indicative responses 311 is covert and is not discernible by the user. For example, coursework management system 120 may require that responses to certain test or quiz questions be voiced or typed, and user responses may be used as both a substantive response for the purpose of grading and for authentication. Likewise, audio, image/video or typed responses in the context of a user forum or discussion group may be captured and conveyed overtly to other participants, while also being used for covert authentication of the participant's identity.

On the other hand, in some cases, situations or embodiments, interactive responses (be they typed, voiced or based on image/video capture) may be in response to a more overt authentication request, such as:

"For authentication, please type your passphrase now" [a typed response] or

"For authentication, please center the image of your face in the on-screen box and state your name" [and audio and visible response] or "For authentication, please move the on-screen avatar along the path illustrated by orienting your head upward, downward and from side to side" [a "gamified" challenge response].

Based on coursework or non-coursework responses and particular feature extraction and classification techniques employed, student authentication subsystem 222 uses the biometrically indicative responses 311 to authenticate identity (313) of a particular student user so that coursework submissions by that student user and grades or scores attributable thereto may be appropriately credited. For purposes of illustration, a separate lookup (314) of student data in a separate course data store 342 is shown, although in some implementations, a combined database or store may be employed. Based on the authenticated identity (313) and on course data 342 maintained for a user whose identity has been authenticated, it is possible to determine (e.g., by student type lookup) whether the particular user (i) is enrolled for credit with a particular sponsoring institution or body, (ii) is a member or subscriber, or (iii) is merely auditing the course (or a unit thereof) as part of an open, non-fee-bearing enrollment. Note that, in some cases, situations or embodiments, a user auditing or participating as part of an open, non-fee-bearing enrollment, need not even be authenticated, and users who fail to authenticate may simply be treated as such.

As illustrated in FIG. 3, participation credit and coursework evaluation (e.g., scoring of tests, quizzes, assignments, etc.) whether automated (by automated coursework evaluation 221) or based on human review, is typically provided to users enrolled for credit or under a membership agreement. Semester, unit or course grades and ultimately credit or certification are typically reserved to such users as well.

Figure 4:
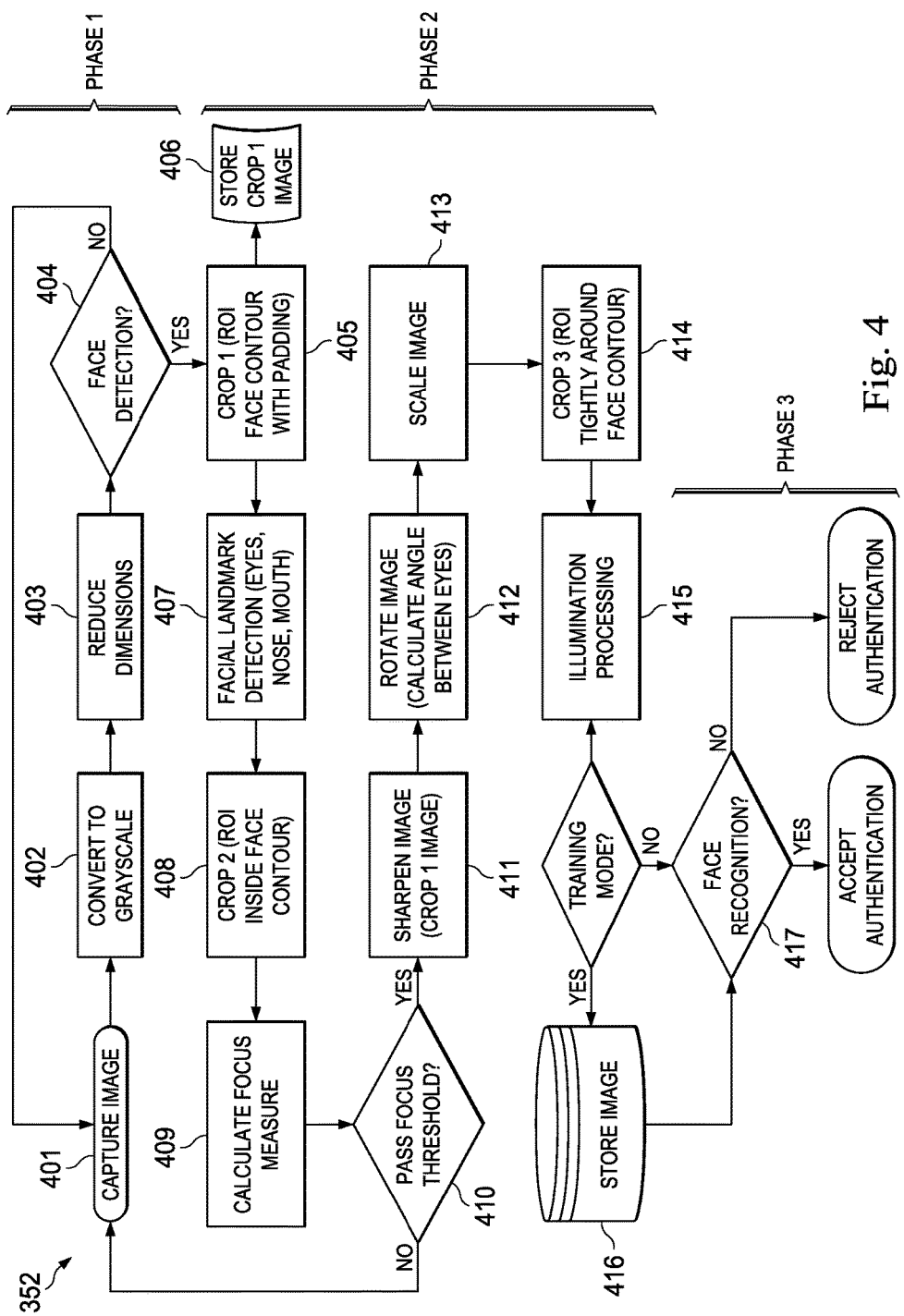
FIG. 4 is a flowchart depicting a three-phase, facial recognition algorithm executable in, or in connection with, image/video-type feature extraction and classification operations to authenticate identity of a particular user consistent with the flows depicted in FIG. 3.
Figure 5:
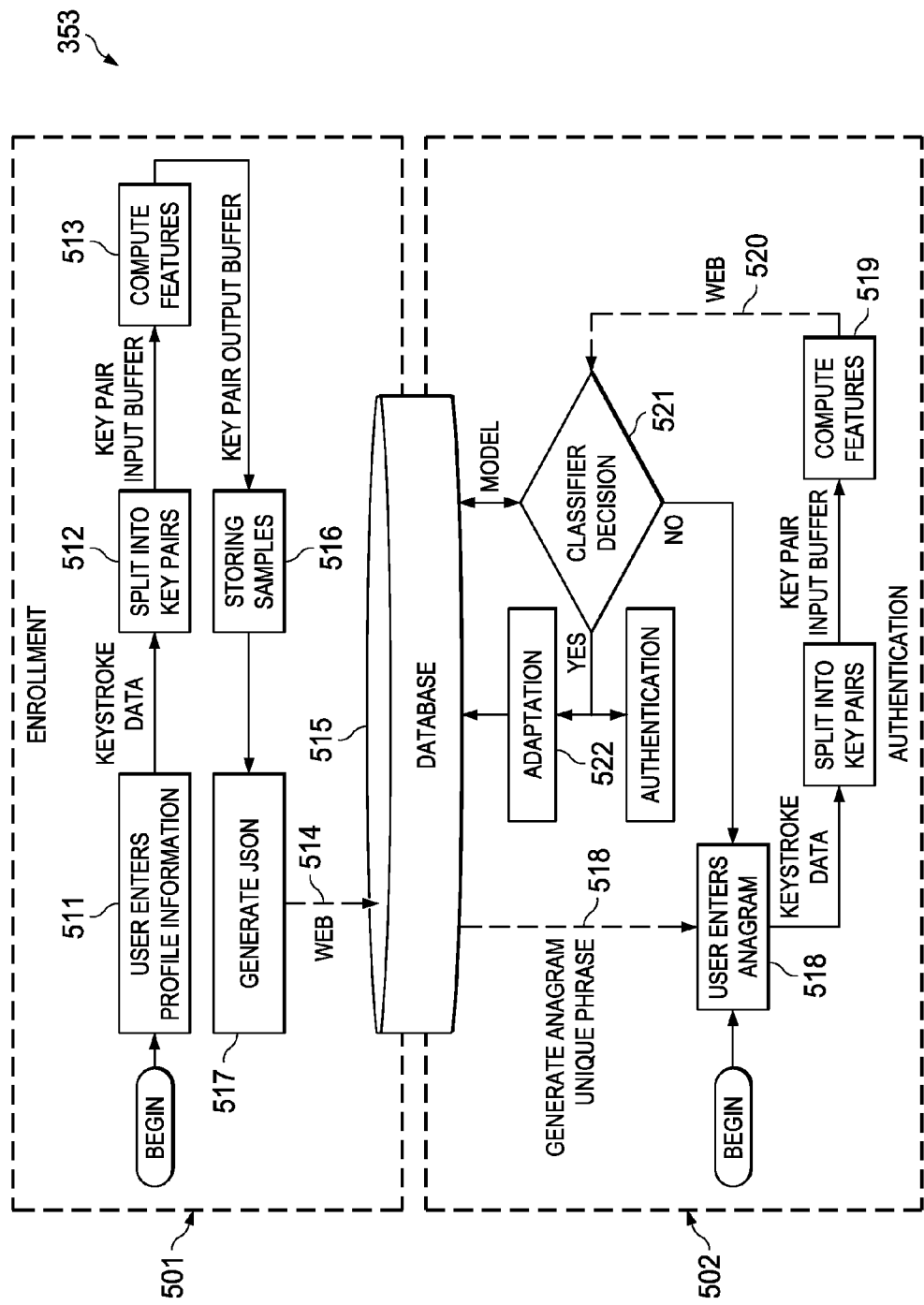
FIG. 5 is a flowchart depicting an algorithm executable in, or in connection with, key sequence timing-type feature extraction and classification operations to authenticate identity of a particular user consistent with the flows depicted in FIG. 3.

Turning next to FIGS. 4, 5 and 9, exemplary user enrollment and identity authentication algorithms are described for facial recognition-type image/video feature extraction and classification 352, for keystroke timing feature extraction and classification 353, and for voiceprint-type audio feature extraction and classification 351. The algorithms are executable in the above-described coursework management system 120 with functionality distributed (as a matter of design choice in any given implementation) amongst server-, cloud- and even workstation-resident computational facilities. Each such algorithm is described in succession and in greater detail below.

Facial Recognition Features and Classification

FIG. 4 is a flowchart depicting a three-phase, facial recognition algorithm executable in, or in connection with, image/video-type feature extraction and classification operations to authenticate identity of a particular user in the flows depicted in FIG. 3. In a first (pre-processing) phase, an image of the user's face is captured (401), typically using a user-workstation resident camera or mobile phone. Next, the captured image is converted (402) to an 8-bit unsigned grayscale image and dimensionally reduced (403) to make pre-processing more efficient. Next, a Viola-Jones (Haar Cascade) classifier attempts to recognize (404) the presence of a face within the image. If a face is detected, the computation proceeds to phase 2. Otherwise, another image capture is attempted and the phase 1 process is retried. In some embodiments, phase 1 processes are performed on a workstation resident processor based on, for example, code demand-supplied from a cloud- or server-resident service platform.

Phase 2 deals primarily with aligning and cropping the image for consistency and to establish a region of interest (ROI) within the captured image. First, the image is cropped (crop 1, 405) around the detected face region (that determined in phase 1 and containing the face contour), and stored (406) for later use. A facial landmark detector (407) determines areas of interest in this region (eyes, nose, mouth, etc.) and their positions are used to make a tighter crop region inside the face. One suitable implementation of facial landmark detector 407 employs a flandmarks algorithm available open source for facial landmark detection, though alternative implementations may employ active appearance models (AAMs), active shape models ASMs, or Viola-Jones Haar cascades for facial landmark detection. Using this facial landmark defined region (crop 2, 408), a focus measure can be calculated (409) to measure blurriness of the facial region of the image. If this region fails to pass a focus threshold check (410), another image capture is attempted and the process is retried for the newly captured image, beginning with phase 1. However, if image focus is acceptable (or if pruning based on a focus threshold violation is disabled), a sharpening filter (411) is applied to subtly sharpen the image and improve contrast in facial features and contours.

Next, the angle between the eyes (determined from the center of each eye interpolated from the eye corners detected using the facial landmark detector) is calculated and used to rotate (412) the image for frontal pose alignment. Additionally, in some implementations, a low-pass (LP) smoothing filter is employed on the eye locations as facial landmark detection is used to recalculate landmarks within each frame, without incorporating the previously calculated facial landmark positions. Next, the image is scaled (413) and cropped (414), based on the (recalculated) facial landmarks. Lastly, additional illumination processing (415, using a Tan-Triggs technique) is applied to reduce the impact of variable illumination in the image and environment. Phase 2 processing seeks to achieve sufficient alignment, scale and illumination consistency between images captured and processed for different subjects to support phase 3 recognition.

When performed as part of a user enrollment or training mode, the result of phase 2 processing is stored in library 416 for use in subsequent identity authentication in the course of coursework submissions. When performed as part of identity authentication in the course of coursework submissions, further processing seeks to recognize the result of phase 2 processing based on the stored library of images.

Lastly, phase 3 recognition (417) attempts to recognize the face against trained images in library 416 of biometric/authentication data store 341 (recall FIG. 3). In some embodiments, a local binary patterns histogram (LBPH) technique is used for face recognition. Using this technique, a distance measure is reported, which can be used as a degree of confidence. An optional threshold parameter is employed for Boolean (true/false) recognition. Fisher Faces and/or Eigenfaces techniques may be employed as an alternative to LBPH in some cases, situations or embodiments. Likewise, alternative embodiments may employ deep learning, specifically convolutional neural network (CNN) techniques, for the face recognition 417.

On-Screen Aiming Mechanism

Using facial landmark detector 407 such as described above, it is possible to track movement of the user's face, and using that tracking, to control the position of cursor, aiming of an on-screen gun or other virtual-world projectile launcher, movement of an avatar or other feature visually displayed on-screen. Accordingly, tracking of detected facial landmarks is used in some embodiments to provide an on-screen aiming mechanism whereby such positional control, aiming or movement is controlled by the user in correspondence with movements of the user's head. In some cases, the user may be presented with an on-screen outline and asked to move his or her head so as to place an image of his or her face within the target outline. In some cases, the target may take other forms such as an image of sunglasses to align with the user's eyes. In some cases, the target may include a moving target (as in a game of space invaders, duck hunt, or the like) that the user needs to track and acquire with their tracked head motions. In general, manipulations of the user's head (and facial presentation) can be employed to improve the quality or uniformity of images and video frames used in authenticating the user.

Keystroke Timing Features and Classification

FIG. 5 is a flowchart depicting an algorithm executable in, or in connection with, key sequence timing-type feature extraction and classification operations to authenticate identity of a particular user in the flows depicted in FIG. 3. As before, the algorithm includes both enrollment (501) and authentication (502) portions and, as before, initial capture of biometrically indicative data (here of keystroke data including dwell and flight times) may be performed (at least in part) on a workstation-resident processor based on, for example, code that is demand-supplied from a cloud- or server-resident service platform.

As part of enrollment 501, the user enters (511) textual content, e.g., as part of user profile entry or in response to some direction from coursework management system 120. Web-based application code executing locally at the user's workstation (e.g., workstation 101, recall FIG. 1) splits (512) the incoming keystroke data into pairs and computes (513) a set of features per key pair that are then used to generate the user's keyboard biometric distributions. These features are stored as a JSON file, sent to a cloud- or server-resident, and later used during the authentication session.

Figure 6:
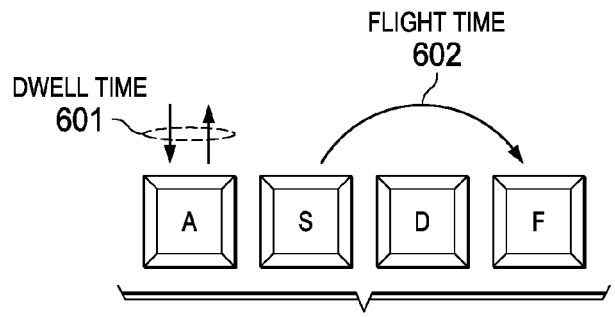
FIG. 6 notionally illustrates dwell time and flight time features extracted from keystroke data.

Turning now to FIG. 6, two examples of biometrically indicative data that may be extracted from keystroke data entered by an enrolling user are key press duration (dwell time 601) and key pair dependent timing (flight time 602). Other candidates for biometrically indicative data that may be employed include time between the previous key down and the current key down (down down timing), relative keystroke speed and certain classes of shift key usage. In an illustrative embodiment of key sequence timing-type feature extraction and classification 353 (recall FIG. 3), three keyboard biometric features are used for authentication:

Flight—The time between the previous key up and the current key down (this time may be negative if the last key is released after the current key press).

Dwell—The time the current key is depressed.

DownDown—The time between the previous key down and the current key down.

Figure 7:
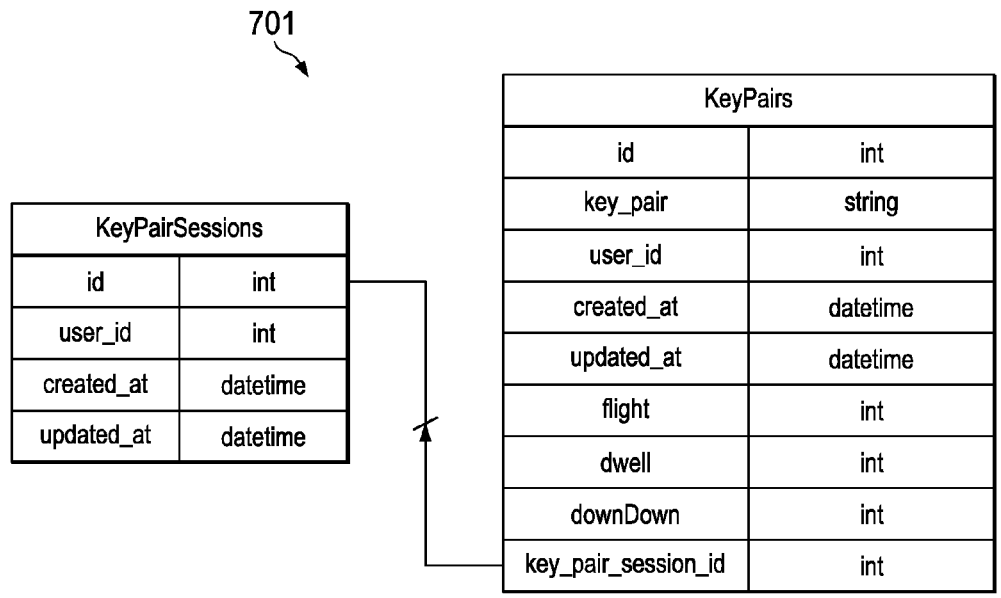
FIG. 7 illustrates a data structure employed in some realizations of algorithms for key sequence timing-type feature extraction and classification operations to authenticate user identity.

Key pairs and their features are collected in the following manner. The alphabet, numbers, space, shift, and commonly used punctuation keys are tracked. Pairs containing untracked keys may be disregarded by the analyzer. Pairs are stored in a KeyPair data structure 701, such as that illustrated in FIG. 7, which stores feature data. FIG. 8 depicts illustrative code 801 suitable for key sequence timing-type feature extraction.

Two buffers are used in the process of key collection: one for storing incomplete KeyPairs (TempBuffer) and another to store completed KeyPairs (MainBuffer). When a user presses a key down, a new instance of KeyPair object 701 is created and the current key down, last key down, and timing data are stored (516) in it. This KeyPair is stored in the incomplete pair buffer. Positive values for the Flight feature may also be stored (516) at this point. When a user lets a key up, the incomplete pair buffer is scanned to see if it that key up completes a KeyPair. If it does, that KeyPair is stored (516) in the completed pairs buffer and removed from the incomplete pairs buffer. Negative Flight values may be stored (516) at this point. When the user finishes text input, a JSON file is created (517) with all the pairs' features which are extracted from the KeyPairs in the completed pair buffer. This JSON file is sent to the database 515.

Once a profile has been created, an anagram based authentication string is created (518) from the top 5%-10% of key pairs (by number of occurrence) or chosen from a list of phrases. The user is prompted to enter (518) the anagram. As before, keystroke data is captured at the user workstation and computationally-defined features for key pairs such as flight, dwell and downdown are computed (519) and communicated (520) for cloud- or server-resident classification (521) against distributions stored in database 515. In general, a rejected authentication brings the user back to the start of the loop (anagram entry 518) and may be repeated several times in case there was a false rejection. If the user is authenticated, then the additional keystroke data is added (522) to database 515. In some cases, situations or embodiments, the user's typed substantive responses in the context of a test, quiz or other coursework may be employed for authentication.

Turning more specifically to classifier operation of key sequence timing-type feature extraction and classification 353 (recall FIG. 3), classifier 521 can be understood as follows. When authenticating a user, there are two sets of pairs/features: the training set and the set to authenticate against that training set. A list of pairs contained in both sets is generated, and only those pairs are considered in the classification. Then, the mean and standard deviation of each feature of each pair in each set is generated. For each feature from each pair, the distance of the mean of the authentication set's feature from the training set's feature is taken, then normalized by the standard deviation of that feature from the training set. This distance is then weighted by multiplying it by the number of occurrences of the pair in the training set. We add up these values for each feature, and then divide by the total amount of pair occurrences. This generates a zScore statistical measure for each feature, without pair relation. These scores are then averaged, and the average is tested against a data derived threshold. The user is successfully authenticated if the score is less than the threshold. In some embodiments, zScore measures may be replaced with other distance metrics such as cosine or Manhattan distance.

Vocal Features and Classification

FIG. 9 is a flowchart depicting an algorithm executable in, or in connection with, voiceprint-type audio feature extraction and classification operations to authenticate identity of a particular user in the flows depicted in FIG. 3. As before, the algorithm includes both enrollment (901) and authentication (902) portions and, as before, initial capture of biometrically indicative data (here of voice pitch, voice power and spectral descriptors such as Mel frequency cepstrum coefficients, MFCCs, and spectral subband centroids, SSCs) may be performed (at least in part) on a workstation-resident processor based on, for example, code that is demand-supplied from a cloud- or server-resident service platform.

A user creates a user profile and, as part of an enrollment phase 901 of audio feature extraction and classification 351, a web based application guides the user through the process of voicing (911) their name and/or a unique phrase multiple times into their computer's microphone. These utterances are sent (912) to cloud- or server-resident computations to have biometrically indicative, computationally-defined features extracted (913) and represented (914) in a JSON file and stored to database 915.

As part of certain coursework submissions 110 or in response to other non-coursework responses 311 (recall FIG.

3), the user is asked to once again voice (916) their name and/or a unique phrase into their microphone. IN some cases, situations or embodiments, the user voices a substantive response in the context of a test, quiz or other coursework submission. In each case, the user's utterance is sent (917) to cloud- or server-resident computations that extract (918) computationally-defined features (e.g., the aforementioned voice pitch, voice power and spectral descriptor-type features) and compare (using classifier 919) those features against the enrollment model represented in database 915. A rejected authentication brings the user back to the start of the loop (vocal capture 916) and may be repeated several times in case there was a false rejection. If the user is authenticated, then the additionally extracted voice pitch, voice power and spectral descriptor-type feature data is added (920) to the training set in database 915 and the oldest example features are removed.

In an illustrative embodiment of the voiceprint-type audio feature extraction and classification 353 (recall FIG. 3) detailed in FIG. 9, three audio features are each extracted (913, 918) from each utterance and used for authentication:

Voice pitch (or noise);
Voice power; and
Spectral descriptors such as MFCCs (the coefficients of a Mel frequency cepstrum, which is a representation of the short-term power spectrum of a sound, based on a linear cosine transform of a log power spectrum on the nonlinear Mel scale of frequency) and/or SSCs (after dividing the FFT spectrum into a certain amount of subbands, the centroid of each subband is calculated).

Such features are typically extracted over time, with short term and global averages typically included in the feature set, to yield both features in time and global measures. Pitch, power, tone and cadence are a useful shorthand for voiceprint-type audio features that may be used in some embodiments, where pitch and power are explicitly calculated, tone is characterized via the spectral measures and cadence is characterized based on timing considerations (e.g., time evolution of features or of the short-term averages).

The utterances are recorded as 22050 Hz 16 bit .wavs, then run through an short-time Fourier transform (STFT) with an FFT size of 1024, a window length of 25 ms, and a step size of 10 ms. Twelve (12) MFCCs (and 1 extra features representing the total energy of the frame) and six (6) SSCs are extracted from each FFT frame. The MFCCs are generated with 26 filters, and the SSCs are generated with 6 filters/bands.

Turning more specifically to classifier operation of voiceprint-type audio feature extraction and classification 351 (recall FIG. 3), classifier 919 can be understood as follows. K-means clustering is used to create a "codebook" of centroids from the training set features. Then, using vector quantization, the distance of each feature (918) in the authentication set from the codebook is calculated, then averaged, and then normalized by the distance/distortion of the training features from the codes. The mean of all these normalized feature "distortions" give a distance metric. This is done separately for the MFCCs and SSCs. Then the two distance scores are averaged. If this average is below this threshold, the user is successfully authenticated. In some cases, situations or embodiments, alternative algorithms may be employed, such as convolutional neural nets using multiple layers and either 2-D or 1-D convolution kernels.

Multi-modal Techniques

While feature extraction and classification/detection techniques have been described separately for various biometrics such as facial (visual) features, speech (audio) features and keystoke/keypair timings, persons of ordinary skill in the art having benefit of the present disclosure will appreciate combinations of these and other feature sets to provide multi-modal authentication. In some cases or embodiments, multiple feature sets and/or classification techniques may be employed to improve, in aggregate or in combination, reliability of individually authentication modalities such as those described herein.

In some cases or embodiments, coherence or consistency between features extracted for differing authentication modalities may be exploited to improve reliability. For example, in embodiments that support audio-visual capture (e.g., simultaneous coordinated capture of both a user's speech and their facial features as that speech is voiced), it is possible match or correlate movements of facial features (e.g., those tracked by facial landmark detector 407, described above) with audio features extracted from the captured vocal speech. In this way, authentication techniques described herein can be employed to (i) classify a particular live image as your face, (ii) confirm that your lips are moving and (iii) verify that the captured vocals are your voice. By employing such a multi-modal technique, systems such as described herein can provide improved robustness to deception. For example, it is difficult to spoof such a multi-modal technique without a latex mask and makeup artist, and only then by an actor who is also a talented vocal mimic.

Other Embodiments and Variations

While the invention(s) is (are) described with reference to various embodiments, it will be understood that these embodiments are illustrative and that the scope of the invention(s) is not limited to them. Many variations, modifications, additions, and improvements are possible. For example, while certain feature extraction and classification techniques have been described in the context of illustrative biometrically indicative data and authentication scenarios, persons of ordinary skill in the art having benefit of the present disclosure will recognize that it is straightforward to modify the described techniques to accommodate other techniques features and classifiers, other biometrically indicative data and/or other authentication scenarios.

Embodiments in accordance with the present invention(s) may take the form of, and/or be provided as, a computer program product encoded in a machine-readable medium as instruction sequences and other functional constructs of software, which may in turn be executed in a computational system to perform methods described herein. In general, a machine readable medium can include tangible articles that encode information in a form (e.g., as applications, source or object code, functionally descriptive information, etc.) readable by a machine (e.g., a computer, server, virtualized compute platform or computational facilities of a mobile device or portable computing device, etc.) as well as non-transitory storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A multi-modal authentication method, comprising:
    initially capturing an enrollment dataset of at least first- and second-type biometrics characteristic of a particular user;
    subsequent to the initial capturing, simultaneously capturing by way of one or more computing device interfaces, (i) a first dataset corresponding to the first-type biometric and (ii) a second dataset corresponding to the second-type biometric, wherein the first-type biometrics include audio features extracted from vocals of the user,
    wherein the second-type biometrics include visual features extracted from an image or video of the user, and
    wherein the first and second datasets are coherent with each other, time-aligned and correspond to a same interactive response by the user to tracking of an on-screen moving target using an on-screen aiming mechanism for detecting and tracking facial landmarks employed to improve quality or uniformity of the image or video of the user;
    computationally determining correspondence of the first- and second-type biometrics with the enrollment dataset;
    authenticating an identity of the user based on the determined correspondence (i) between the first- and second-type biometrics with the enrollment dataset and (ii) between the time-aligned audio and visual features.

2. The multi-modal authentication method of claim 1, wherein the correspondence determining further includes:
    computationally determining correspondence between time-aligned ones of the audio and visual features respectively extracted from the vocals and image or video of the user in connection with the interactive response.

3. The multi-modal authentication method of claim 1, wherein for the first-type biometrics, the correspondence determination includes comparison of Mel frequency cepstrum coefficients (MFCCs) or spectral subband centrolds (SSCs) using a trained classifier.

4. The multi-modal authentication method of claim 1, wherein for the second-type biometrics, the correspondence determination includes use of a local binary patterns histogram (LBPH) technique performed on an aligned, cropped and illumination adjusted image.

5. The multi-modal authentication method of claim 1, further comprising:
    performing the capturing of the enrollment dataset using the one or more computing device interfaces and in connection with the user's interactive response thereon.

6. The multi-modal authentication method of claim 1, wherein the first and second datasets are captured covertly in connection with the interactive user responses.

7. The multi-modal authentication method of claim 1, wherein the audio features extracted from vocals of the user include at least one of a frequency domain spectrum of the vocals of the user, a pitch of the vocals of the user, power of the vocals of the user, a tone of the vocals of the user, and a cadence of the vocals of the user.

8. The multi-modal authentication method of claim 1, wherein the visual features extracted from an image or video of the user include at least one of position and movement of one or more respective facial features of the user.

9. The multi-modal authentication method of claim 1, further comprising:
    computationally determining a lack of correspondence between either or both of (i) the enrollment dataset and the first- or second-type behavioral biometrics and (ii) the time-aligned audio and visual features; and
    responsive to the determined lack of correspondence:
        presenting the user with supplemental identity validation task and capturing the user's response thereto; and
        authenticating the identity of the user based on the captured user response to the supplemental identity validation task.

10. The multi-modal authentication method of claim 9, wherein the supplemental identity validation task includes speaking a passphrase.

11. The multi-modal authentication method of claim 9, wherein the supplemental identity validation task includes typing a passphrase; and
    wherein the identity authenticating includes computationally evaluating correspondence of captured key sequence timings with key sequence timings previously captured for, and previously determined to be, characteristic of the user.

12. The multi-modal authentication method of claim 1, wherein the tracking of the on-screen moving target includes controlling a position of an on-screen aiming mechanism in correspondence with movements of the user's head.

13. The multi-modal authentication method of claim 1, wherein the tracking of the on-screen moving target includes tracking of the on-screen moving target based on movements of the user's head.

14. The multi-modal authentication method of claim 1, wherein the tracking of the on-screen moving target includes manipulations of the user's head or facial presentation.

15. An authentication method, comprising:
    capturing, by way of a computing device or an audio interface, a sequence of audio features extracted from vocals of a particular user, wherein the captured sequence of audio features corresponds to a training speech sequence, and wherein the captured sequence of audio features includes one or more of a frequency domain spectrum, a pitch, a power, a tone, and a cadence of the vocals of the particular user;
    capturing, by way of the computing device or an image or video interface, a sequence of visual features extracted from an image or video of the particular user, wherein the captured sequence of visual features includes one or more facial movements corresponding to the captured sequence of audio features;
    from the captured sequence of corresponding audio and visual features, computationally evaluating at least a portion of the training speech sequence including computational evaluation of the corresponding facial movements and the one or more of the frequency domain spectrum, the pitch, the power, the tone, and the cadence of the vocals of the particular user, thereby determining an audio-visual biometric characteristic of the particular user and suitable to discriminate the training speech sequence spoken by the particular user from the training speech sequence spoken by a statistically significant set of other users;

storing the audio-visual biometric for use in future authentication of the particular user based on an authentication speech sequence spoken by the particular user, wherein the authentication speech sequence does not directly correspond to the training speech sequence, but shares the computationally evaluated portion of the training speech sequence determined to provide the audio-visual biometric; and based on the stored audio-visual biometric, computationally evaluating portions of speech sequences, in the course of an interactive session, by a user at a computing device or interface and, based on correspondence with the audio-visual biometric, authenticating or confirming authentication of the particular user;

wherein during the interactive session, the user provides an interactive response including tracking of an on-screen moving target using an on-screen aiming mechanism for detecting and tracking facial landmarks employed to improve quality or uniformity of the image or video of the particular user.

16. The authentication method of claim 15, further comprising:

based on the stored audio-visual biometric, generating and supplying a challenge to a user who purports to be the particular user, wherein the challenge solicits speech entry at a computing device or interface and wherein the solicited speech entry includes the portion of the training speech sequence that the computational evaluation of the corresponding facial movements and the one or more of the frequency domain spectrum, the pitch, the power, the tone, and the cadence of the vocals of the particular user determined provide the audio-visual biometric.

17. The authentication method of claim 15, further comprising:

performing, at successive times throughout the interactive session, the computational evaluating of portions of speech sequences for correspondence with the audio-visual biometric.

18. The authentication method of claim 17, wherein the computational evaluating, at successive times throughout the interactive session, of portions of speech sequences for correspondence with the audio-visual biometric is covert.

19. The authentication method of claim 15, further comprising:

capturing the sequence of corresponding audio and visual features corresponding to the authentication speech sequence, in ordinary course of the interactive session, by a user who purports to be the particular user.

20. The authentication method of claim 15, further comprising:

performing (i) capture of the corresponding sequences of audio and visual features and (ii) the determination of the portion of the training speech sequence determined to provide the audio-visual biometric in a networked computing environment wherein a user enters speech at a client user interface system as part of a session with a remote, network connected service platform; and communicating, from the client user interface system to the remote, network connected service platform, the facial movements and the corresponding one or more of the frequency domain spectrum, the pitch, the power, the tone, and the cadence of the vocals of the particular user for the portion of the training speech appearing in the captured sequence of corresponding audio and visual features.

21. An authentication method, comprising:

generating and supplying, at a computing device or interface, an on-screen moving target in a first position and an on-screen aiming mechanism for detecting and tracking facial landmarks in image sequences captured with an image sensor, wherein the detecting and tracking facial landmarks is used for aiming at the on-screen moving target in the first position;

capturing, by way of a computing device having or interface coupled to an image sensor directed toward a particular user, motion of visual features including gross user motion or fine user motion including motion of one or more facial landmarks;

based on the captured motion of the visual features, moving the on-screen aiming mechanism correspondingly to, in magnitude and direction, the captured motion of the visual features, wherein the motion of the visual features and corresponding movement of the on-screen aiming mechanism brings the on-screen aiming mechanism into at least a partially overlapping alignment with the on-screen moving target in the first position; and with the on-screen aiming mechanism in the at least partially overlapping alignment with the on-screen moving target in the first position, capturing by way of the computing device or interface, an image of the particular user in a first position, wherein the image of the particular user in the first position is computationally evaluated and a corresponding first position score is generated, where the generated first position score is used for user recognition and authentication.

22. The authentication method of claim 21, wherein movement of the on-screen aiming mechanism is in correspondence with the tracking of the one or more of the facial landmarks across a captured visual field.

23. The authentication method of claim 21, further comprising:

based on the captured motion of the visual features, moving the on-screen aiming mechanism into at least a partially overlapping alignment with the on-screen moving target in a second position; and with the on-screen aiming mechanism in the at least partially overlapping alignment with the on-screen moving target in the second position, capturing, by way of the computing device or interface, an image of the particular user in a second position, wherein the image of the particular user in the second position is computationally evaluated and a corresponding second position score is generated, where the generated second position score is used for user recognition and authentication.

24. The authentication method of claim 23, further comprising:

processing, by way of the computing device or interface, the generated first and second scores;

determining that the processed first and second scores satisfy a threshold confidence level; and authenticating an identity of the particular user based on the processed first and second scores satisfying the threshold confidence level.

25. The authentication method of claim 23, further comprising:

setting a user identification for the particular user;

capturing, by way of the computing device or interface, an image of the particular user in a first training position, wherein the image of the particular user in the first training position is computationally evaluated and a corresponding first training position score is generated, where the generated first training position score is used for user recognition and authentication;

capturing, by way of the computing device or interface, an image of the particular user in a second training position, wherein the image of the particular user in the second training position is computationally evaluated and a corresponding second training position score is generated, where the generated second training position score is used for user recognition and authentication; and storing a visual biometric based at least in part on the generated first and second training position scores, wherein the visual biometric corresponds to the user identification for the particular user.

* * * * *